United States Patent [19]

Ogawa

[11] Patent Number: 4,589,829
[45] Date of Patent: May 20, 1986

[54] VANE PUMP

[75] Inventor: Hitoshi Ogawa, Himeji, Japan

[73] Assignee: Mitsubishi Denki Kabushiki Kaisha, Tokyo, Japan

[21] Appl. No.: 642,207

[22] Filed: Aug. 20, 1984

[30] Foreign Application Priority Data

Aug. 20, 1983 [JP] Japan .................... 58-128715[U]
Aug. 20, 1983 [JP] Japan .................... 58-128716[U]
Aug. 20, 1983 [JP] Japan .................... 58-128717[U]
Oct. 14, 1984 [JP] Japan .................... 58-159821[U]

[51] Int. Cl.⁴ .............................................. F04C 2/00
[52] U.S. Cl. ................................................... 418/259
[58] Field of Search ............. 418/3, 15, 259, 266–270; 417/348, 209

[56] References Cited

U.S. PATENT DOCUMENTS

| | | | |
|---|---|---|---|
| 2,804,261 | 8/1957 | Oishei | 418/269 |
| 2,924,178 | 2/1960 | Hogan | 417/348 |
| 3,099,387 | 7/1963 | Beckfield | 418/268 |
| 3,381,891 | 5/1968 | Bellmer . | |
| 3,412,686 | 11/1968 | Eickmann . | |
| 4,098,256 | 7/1978 | Sieck | 418/266 |
| 4,183,352 | 1/1980 | Spencer | 418/266 |
| 4,290,736 | 9/1981 | Bernasconi | 418/270 |

FOREIGN PATENT DOCUMENTS

| | | |
|---|---|---|
| 163004 | 1/1904 | Fed. Rep. of Germany . |
| 3326389 | 2/1984 | Fed. Rep. of Germany ...... 418/259 |
| 3240523 | 5/1984 | Fed. Rep. of Germany . |
| 153327 | 2/1922 | United Kingdom . |

Primary Examiner—Leonard E. Smith
Assistant Examiner—Jane E. Obee
Attorney, Agent, or Firm—Oblon, Fisher, Spivak, McClelland & Maier

[57] ABSTRACT

A vane pump comprises a rotor mounted on a rotary shaft in coaxial therewith, a plurality of vanes held in the circumferential part of the rotor so as to be slidable in the radial direction, a housing having an inner space of an elliptical form in cross section, in which the top ends of the vanes projecting from the rotor by centrifugal force resulted from the revolution of the rotor move in slide-contact with the inner wall of the housing, two parts in the small radius sections of the elliptical inner space being close to the outer surface of the rotor, while two parts in the large radius sections having cylindrical inner surfaces which form two operating chambers in association with the rotor, and intake and discharge ports being respectively communicated with the operating chambers.

3 Claims, 3 Drawing Figures

VANE PUMP

BACKGROUND OF THE INVENTION

The present invention relates to an improvement in a vane pump.

A vane pump is of a type such that suction and discharge of a fluid are performed by revolution of vanes in slide-contact with the inner circumferential surface of a housing, the vanes being projected from a rotor due to centrifugal force resulted when the rotor is rotated.

FIG. 1 is a sectional view of a conventional vane pump and FIG. 2 is a sectional view taken along the line II—II' in FIG. 1. A reference numeral 1 designates a motor for driving the vane pump, which comprises a frame 1a and a rotary shaft 2 pivotally supported by the frame 1a. A rotor 3 is fixed to the rotary shaft 2. A plurality of vanes 4 are respectively held in grooves formed in the rotor 3 in the radial direction so as to be slidable along the grooves. The rotor 3 with the vanes 4 is received in the inner space of a housing 5, the inner space of the housing having a cylindrical inner circumferential surface the center of which is deflected from the center of the rotary shaft 2, i.e. the rotor 3. At both sides of the housing 5, arranged are a side plate 6 and a cover plate 7 which form an operating chamber 8 in association with the rotor 3. An intake port 9 and a discharge port 10 are respectively provided at different positions in the outer circumferential part of the housing 5 to be communicated with the operating chamber 8 formed in the housing 5. The housing 5, the side plate 6 and the cover plate 7 are secured to the frame 1a of the motor 1 by means of a fitting bolt 11. A sealing member 12 is fitted to the frame 1a to be in relative slide-contact with the rotary shaft 2.

In the vane pump having the construction as above-mentioned, upon actuating the motor 1, the rotary shaft 2 is rotated in the direction of the arrow mark along with the rotor 3 mounted on the rotary shaft 2. The rotation of the rotor 3 causes the vanes 4 which are slidably held in the grooves formed in the radial direction of the rotor 3 to project outward due to centrifugal force and to move in slide-contact with the inner circumferential surface of the housing 5. In this case, the inner space of the housing 5 is in an eccentrical relation to the rotor 3 whereby as the rotor 3 rotates, the capacity of the operating chamber 8 defined by the vanes 4 is changed. Namely, there is a boundary in the inner circumferential surface portion of the housing 5, the boundary being at the closest position to the axial center of the rotary shaft 2. The capacity of the operating chamber 8 increases for 180° revolution of the rotor 3 and the capacity decreases for the subsequent 180° revolution of the rotor. Accordingly, a fluid is sucked from the intake port formed at one side with respect to the boundary at the inner circumferential surface portion of the housing 5 which is the nearest to the axial center of the rotary shaft 2 and the fluid thus sucked is discharged through the discharge port 10; thus, pumping operations is obtainable.

When the vane pump as above-mentioned is used for an air source for a burner, it is necessary to produce a primary air of a high pressure and a small flow rate to atomize fuel and a secondary air of a low pressure and a large flow rate to perform combustion of fuel. However, in the construction of the conventional vane pump, when the primary and secondary air are to be supplied with a single pump, air having a high pressure and a large flow rate are needed to result in increase in the capacity of the pump. And also, a controlling mechanism for supplying the primary and secondary air becomes very complicated. Accordingly, when the vane pump is used for an air source for a burner, two separate vane pumps for the primary air supply and the secondary air supply are needed with the result of increase in manufacturing cost.

The vane pump is used as a vacuum pump to impart vacuum condition to a vacuum servo brake of cars. Also, it is used as an air pump for recombustion of an exhaust gas of cars or for supercharging a thin air to the engine. The principle of operations of both the pumps is identical. However, a vacuum pump sucks fluid from a load side unless a brake is operated. On the other hand, the air pump always supercharges air to the engine. Accordingly, condition of fluid in the vacuum pump and the air pump is opposite each other. It is therefore necessary to use two pump devices independently when vacuum condition and supercharging condition are simultaneously needed.

In a car, there are two types of load sources for the vacuum pump, namely the vacuum servo brake consuming a great quantity of vacuum at the time of operating the brake and a chamber of a constant speed driving device which always requires a small quantity of vacuum in its operation. Accordingly, if a single vacuum pump is used, the vacuum condition is always needed by the constant speed driving device and occasionally, a great quantity of vacuum is consumed by braking operation. In latter case, charging of vacuum becomes short to thereby cause adverse effect to braking performance. To avoid of such problem, a large capacity vacuum pump with a vacuum tank for storage of the vacuum condition is needed.

A car should be provided with a vacuum pump used to supply a vacuum to a vacuum servo brake and an oil pump used for a hydraulic system for power stirring of cars and adjustment of the height of cars. Therefore, two kinds of fluid i.e. air and oil have to be controlled. A vacuum pump and an oil pump are respectively required for these purposes. Although the structure and principle of the operations of the pumps are identical.

SUMMARY OF THE INVENTION

It is an object of the present invention to effect to pumping operations having different functions with use of a single vane pump.

The foregoing and the other objects of the present invention have been attained by providing a vane pump which comprises a rotor mounted on a rotary shaft coaxial therewith, a plurality of vanes held in the circumferential part of the rotor so as to be slidable in the radial direction, a housing having an inner space of an elliptical form in cross section, in which the top ends of the vanes projecting from the rotor by centrifugal force resulted from the revolution of the rotor move in slide-contact with the inner wall of said housing, two parts in the small radius sections of the elliptical inner space being close to the outer surface of the rotor, while two parts in the large radius sections having cylindrical inner surfaces which form two operating chambers in association with the rotor, and intake and discharge ports being respectively communicated with the operating chambers.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

A preferred embodiment of the vane pump according to the present invention will be described with reference to drawing.

DETAILED DESCRIPTION OF THE PREFERRED EMBODIMENT

Figure 1:
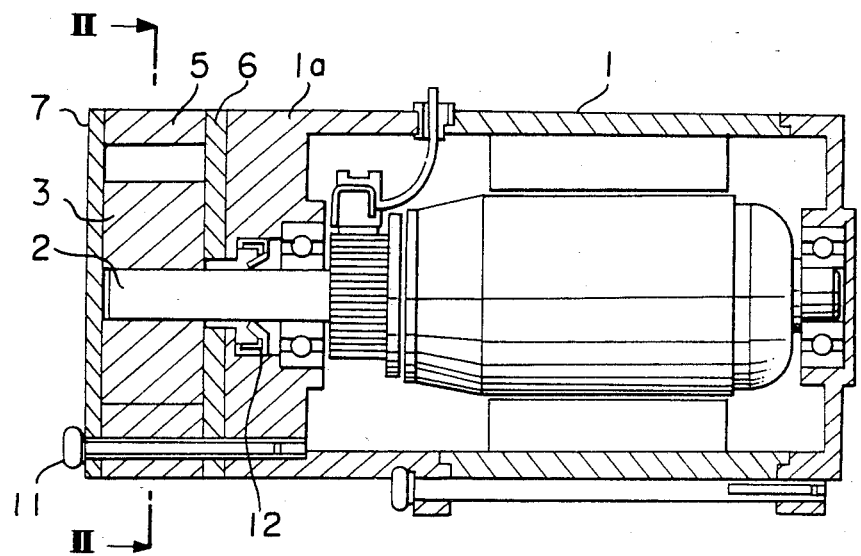
FIG. 1 is a cross-sectional view of an important part of a conventional vane pump device.
Figure 2:
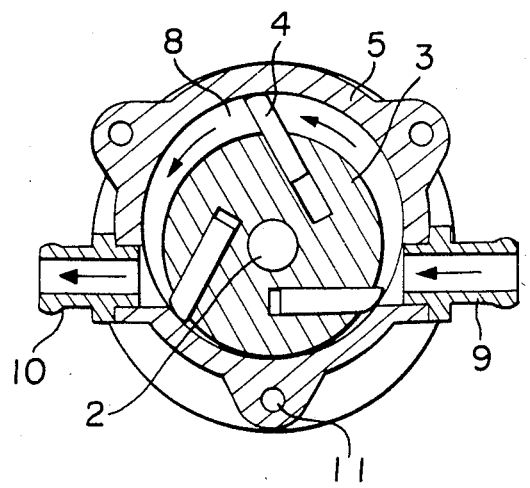
FIG. 2 is a cross-sectional view taken along II—II' in FIG. 1.
Figure 3:
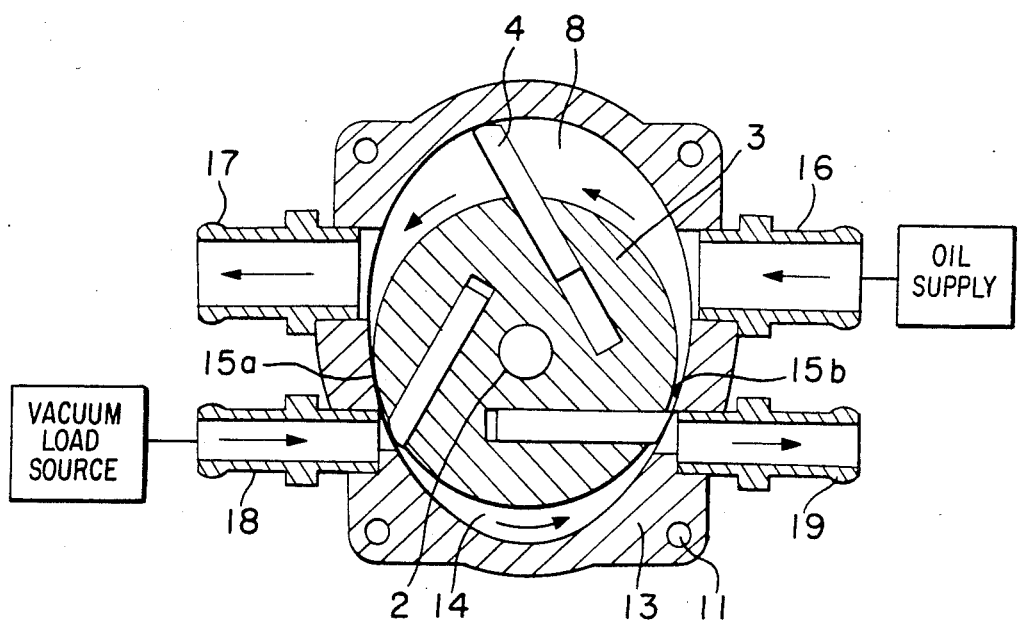
FIG. 3 is a cross-sectional view of an embodiment of the vane pump according to the present invention.

FIG. 3 is a cross-sectional view of an embodiment of the present invention. In FIG. 3, a reference numeral 13 is a housing having a generally elliptical inner circumferential surface, specifically, the elliptical inner circumferential surface is formed such that a circular arc having a relatively large radius, in cross section, is formed on one side of the long diameter portion and a circular arc having a relatively small radius is formed on the other side thereof. A rotor 3 is rotatably received in the elliptical inner circumferential surface so that an operating chamber 8 having a large capacity and an operating chamber 14 having a small capacity are formed between the rotor 3 and the inner circumferential surface. Boundary portions of the operating chambers 8, 14 are constituted by points 15a, 15b which are formed by the housing 13 and the rotor 3 with a very small space or gap. An intake port 16 and a discharge port 17 are formed to be communicated with the operating chamber 8 opposing at both side walls and an intake port 18 and a discharge port 19 are formed to be communicated with the operating chamber 14 opposing at both side walls.

In the vane pump having construction as above-mentioned, when the rotary shaft 2 is driven counter clockwisely by a motor (not shown), the rotor 3 mounted on the rotary shaft 2 is also driven in the direction as indicated by arrow marks. During the revolution of the rotor 3, the operating chambers 8, 14 (the volume of the operating chamber 8 is greater than that of the operating chamber 14) are defined by the housing 13 having a generally elliptical inner space (somewhat deformed) and the rotor 3. The vanes 4 project outwardly due to centrifugal force resulted from the revolution of the rotor 3 and move in slide-contact with the inner circumferential surface of the housing 13. Accordingly, the operating chamber 8 sucks fluid from the intake port 16 and discharges it through the discharge port 17. On the other hand, the operating chamber 14 sucks fluid from the intake port 18 and discharge it through the discharge port 19. Thus, a single vane pump of the present invention performs two pumping operations independent of each other. Accordingly, when the vane pump of this embodiment is used for an air supply source for a burner, the small capacity operating chamber 14 is used for a pump for supplying a primary air having a high pressure and a small flow rate to use it for atomization of fuel, through the discharge port 19. The large capacity operating chamber 8 is used for a pump for supplying a secondary air having a low pressure and a large flow rate to use it for a burner for combustion, through the discharge port 17.

When the vacuum pump of this embodiment is to be used as bifunctional pumping device for a vacuum servo brake and supercharging of air, the small capacity operating chamber 14 functions as a vacuum pump by connecting a vacuum load to the intake port 18 and air sucked through the intake port 16 is fed to the engine as a supercharged air by connecting the discharge port 17 communicated with a large capacity operating chamber 8 to an intake manifold of the engine.

In the event that the vane pump of this embodiment is used commonly to a vacuum servo brake and a constant speed driving device, the small capacity operating chamber 14 sucks air from the intake port 18 and discharges it through the discharge port 19 to provide vacuum condition to the constant speed driving device which is connected to the intake port 18 and the large capacity operating chamber 8 sucks air from the intake port 16 and discharges a large amount of air through the discharge port 17. Therefore, it is possible to supply a sufficient amount of vacuum to a load requiring a large amount of vacuum, such as a vacuum servo brake by connecting the intake port 16. On the other hand, there causes no adverse effect to the constant speed driving device.

According to the above-mentioned embodiment of the present invention, the following advantage is obtainable. Two operating chambers having different capacity can be used for performing separate functions: one of the operating chamber is used for a vacuum pump and the other for an air pump; two operating chambers are used for vacuum pumps, but pressure and flow rate being different and two operating pumps are used for air pumps, but pressure and flow rate being different.

In the next place, description will be made as an embodiment in which the vane pump is used as a vacuum pump and an oil pump. The small capacity operating chamber 14 sucks air from the intake port 18 and discharge it through the discharge port 19 to impart vacuum condition to a vacuum load source connected to the intake port 18. On the other hand, the large capacity operating chamber 8 sucks oil from the intake port 16 and discharges it through the discharge port 17 whereby hydraulic pressure is applied to an oil supply connected to the discharge port 17.

In this embodiment, the vacuum pump and the oil pump is realized in the single common housing 13. Accordingly, formation of an oil film is possible by oil in the oil pump by properly determining clearances in the air gaps at the dead points 15a, 15b, the contacting areas between the rotor 3 and the vanes 4, and between the rotor 3 and side plate 6 or the cover plate 7. That is, the gaps at 15a and 15b are sized so as to permit sufficient oil to be transferred to chamber 14 to form an oil film therein. Formation of oil film improves properties such as wear property and air-tight property in comparison with a conventional oilless maintenance type pump.

In the embodiment as above-mentioned, the inner circumferential surface is made generally elliptical to form two independent operating chambers to realize separate pumping operations in a single pump, i.e. one for a vacuum pump and the other for an oil pump. Accordingly, it is no longer necessary to use two pump devices as required in the conventional machine. This provides an economical advantage.

In the several embodiments of the present invention, description has been made as to the vane pump driven by an electric motor; however, another driving source may be used to drive the vane pump.

I claim:

1. A vane pump comprising:

a housing having an elliptical inner space;

a rotor mounted in said inner space for rotation about a fixed axis such that a peripheral surface of said rotor is spaced apart from a peripheral surface of said space to define gaps at two positions, whereby said rotor and housing cooperate to define first and second operating chambers in said space, said first operating chamber being larger than said second operating chamber, said operating chambers communicating at said gaps;

a plurality of vanes slidably positioned in said rotor and extendable into contact with said peripheral surface of said space;

a first inlet for said first operating chamber, said first inlet communicating with one of a source of oil and a vacuum load source;

a first outlet for said first operating chamber;

a second inlet for said second operating chamber, said second inlet communicating with the other of a source of oil and a vacuum load source; and a second outlet for said second operating chamber, wherein said gaps are sized so as to permit sufficient oil to be transferred from one of said operating chambers to the other of said operating chambers to form a continuous oil film about said inner space of said other of said operating chambers, whereby said other of said operating chambers is sufficiently lubricated by said continuous oil film.

2. The vane pump of claim 1 wherein said one of said operating chambers is said first chamber and said other of said operating chambers is said second chamber.

3. The vane pump according to claim 1, wherein said rotor is driven by a motor.

* * * * *